United States Patent
Kojima

[11] Patent Number: 6,166,512
[45] Date of Patent: Dec. 26, 2000

[54] CONTROLLER FOR DIESEL ELECTRIC LOCOMOTIVE

[75] Inventor: Shigeru Kojima, Tokyo, Japan

[73] Assignee: Mitsubishi Denki Kabushiki Kaisha, Tokyo, Japan

[21] Appl. No.: 09/325,853

[22] Filed: Jun. 4, 1999

[30] Foreign Application Priority Data

Jul. 2, 1998 [JP] Japan ................................. 10-186750

[51] Int. Cl.⁷ ..................................................... H02P 3/18
[52] U.S. Cl. ........................ 318/759; 318/802; 318/811; 318/380
[58] Field of Search ........................ 180/197; 246/168.1; 303/151, 152; 318/757–759, 798–803, 805–812, 375–380

[56] References Cited

U.S. PATENT DOCUMENTS

| | | | |
|---|---|---|---|
| 3,675,099 | 7/1972 | Johnston | 318/762 |
| 3,688,171 | 8/1972 | Salihi et al. | 318/759 |
| 3,737,745 | 6/1973 | Chevaugeon et al. | 318/52 |
| 3,951,467 | 4/1976 | Fleagle | 303/20 |
| 4,037,881 | 7/1977 | Fleagle | 303/195 |
| 4,686,434 | 8/1987 | Kojima et al. | 318/52 |
| 4,697,130 | 9/1987 | Dadpey et al. | 318/760 |
| 4,777,420 | 10/1988 | Dadpey et al. | 318/758 |
| 5,436,538 | 7/1995 | Garvey et al. | 318/52 |
| 5,480,220 | 1/1996 | Kumar | 303/151 |
| 5,550,457 | 8/1996 | Kusase et al. | 322/29 |

*Primary Examiner*—David S. Martin
*Attorney, Agent, or Firm*—Sughrue, Mion, Zinn, Macpeak & Seas, PLLC

[57] ABSTRACT

In controller for diesel electric locomotive, after output from an alternating current generator driven by a diesel engine is rectified into direct current power, the direct current power is inverted into alternating current power by an inverter to thereby carry out a power run control of an induction motor, and energy generated by the induction motor is consumed at a brake resistor by moving a brake chopper when the brake is applied. When a revolving speed of said induction motor exceeds a predetermined value at the time of power run, an slip control unit detects slip of wheels and outputs an output reduction signal for the induction motor in correspondence to a level of slip. An output torque of the induction motor is reduced with the output reduction signal. Further, a reduced amount of the output torque of the induction motor is consumed at a brake resistor through a conduction ratio control of the brake chopper.

9 Claims, 5 Drawing Sheets

CONTROLLER FOR DIESEL ELECTRIC LOCOMOTIVE

BACKGROUND OF THE INVENTION

1. Field of the Invention

The present invention relates to a controller for diesel electric locomotive which converts output from a diesel engine into electric power and supplies alternating current power to a driving induction motor.

2. Description of the Related Art

FIG. 6 is a block diagram which shows a configuration of a related controller for diesel electric locomotive. In FIG. 6, an alternating current generator 2 which is directly connected to a diesel engine 1 generates alternating current power. The alternating current power is rectified into direct current power by a rectifier 3. The direct current power is further inverted into alternating current by a VVVF inverter 4 for power control of an induction motor 5 so as to carry out speed control of the diesel electric locomotive at the time of power run.

Additionally, if input voltage at the VVVF inverter 4 exceeds a set value due to wheel slip that occurs at the time of power run, voltage detecting means 6 detects over-voltage to carry out predetermined protective action.

When a brake is applied, in addition to idling operation of the diesel engine 1, the voltage detecting means 6 detects the voltage generated by the induction motor 5 and the brake chipper 8 is controlled for a conduction ratio by a conduction ratio control means 7 in accordance with the generated voltage. The energy generated by the induction motor 5 is consumed at a brake resistor and thus speed of the diesel electric locomotive is reduced.

With the structure of the related controller for diesel electric locomotive, if a re-cohesion control for reducing output torque of the induction motor 5 fast is carried out when wheel slip has occurred due to road surface conditions at the time of power run, failure in following-up decrease in the diesel engine output causes an abnormal increase in revolving speed of the diesel engine. This results with overvoltage at the input voltage of the VVVF inverter 4 due to an increase in output voltage of the alternating generator 2 and thus causes a problem that the voltage detection means 6 carries out the protective actions.

SUMMARY OF THE INVENTION

The present invention as a solution to the above-described problem is purposed to provide a controller for diesel electric locomotive which facilitates re-cohesion control when slip occurs.

To solve the above purpose, there is provided with a controller for diesel electric locomotive, in which, after output from an alternating current generator driven by a diesel engine is rectified into direct current power, the direct current power is inverted into alternating current power by an inverter to thereby carry out a power run control of an induction motor, and energy generated by the induction motor is consumed at a brake resistor by moving a brake chopper when the brake is applied, wherein when a revolving speed of the induction motor exceeds a predetermined value at the time of power run, an slip control unit detects slip of wheels and outputs an output reduction signal for said induction motor in correspondence to a level of slip, an output torque of said induction motor is reduced with the output reduction signal, and a reduced amount of the output torque of the induction motor is consumed at a brake resistor through a conduction ratio control of the brake chopper.

DETAILED DESCRIPTION OF THE PREFERRED EMBODIMENTS

[First Embodiment]

Figure 1:
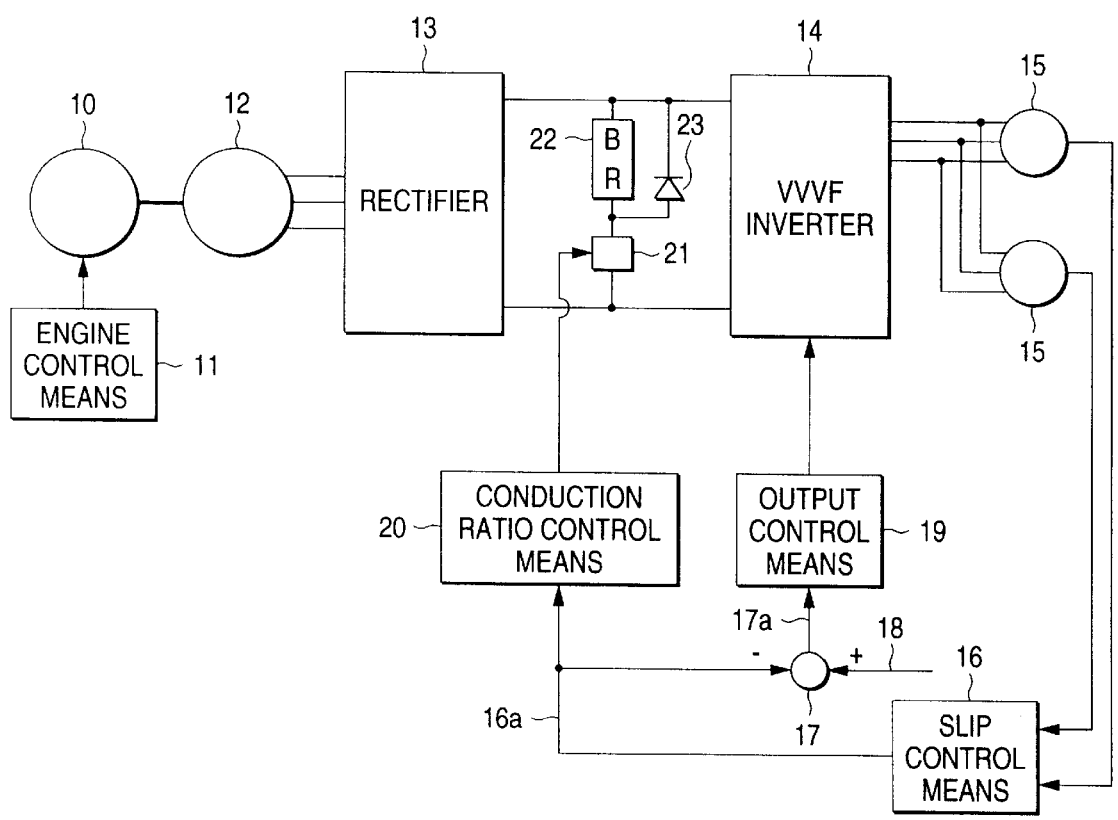
FIG. 1 is a block diagram showing the first embodiment of the present invention.
Figure 2A:
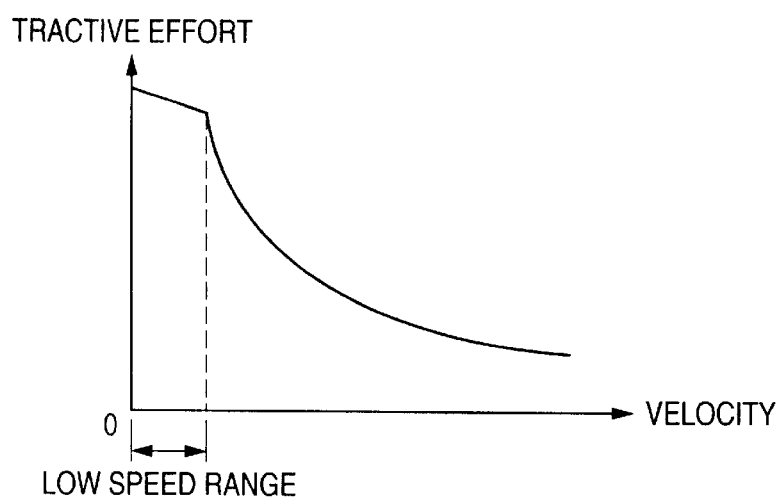
FIGS. 2A to 2C are illustrative drawings showing the actions in FIG. 1.
Figure 2B:
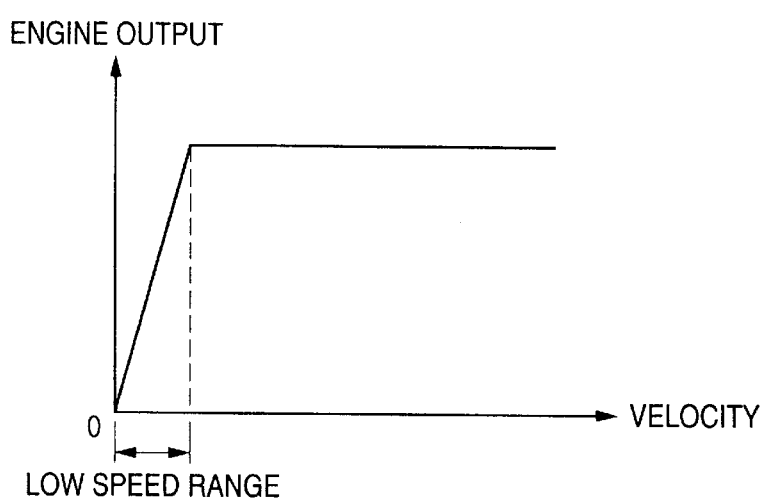
Figure 2C:
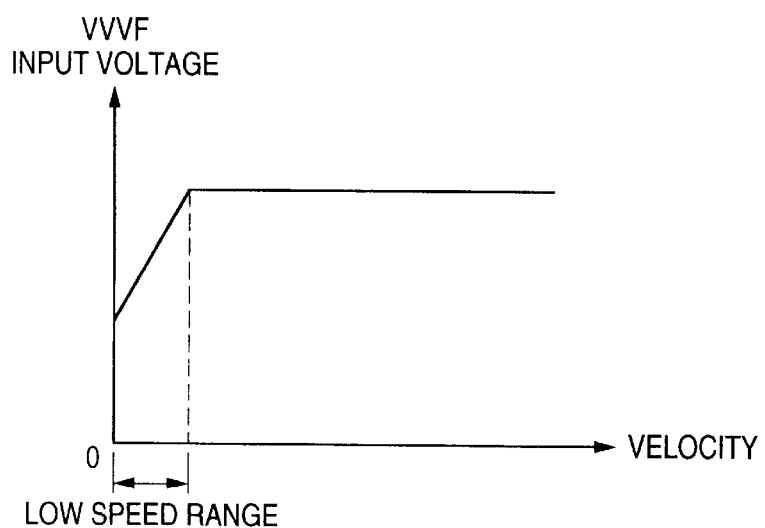

FIG. 1 is a block diagram showing a structure of a first embodiment. FIG. 1 shows a diesel engine 10 which has such characteristics of traction, engine output and generator output (VVVF inverter input voltage characteristic) as shown in FIGS. 2A to 2C. An engine control means 11 carries out output control of the diesel engine 10. An alternating current generator 12 is connected directly to the diesel engine 10. A rectifier 13 rectifies the alternating current power that is an output from the alternating current generator 12 into direct current power. A variable voltage and variable frequency (VVVF) inverter 14 inverts the direct current power which is an output from the rectifier 13 into alternating current power. An induction motor 15 is connected to the VVVF inverter 14, which generates driving force for a diesel electric locomotive (not shown). An slip control means 16 detects wheel slip and outputs an output reduction signal 16a corresponding to the level of slip when incremental ratio of the revolving speed of the induction motor 15 exceeds a predetermined value. An adder 17 adds the output reduction signal 16a (−) and a target value command signal 18 (+) which instructs an output value of the induction motor 15 at the time of power run and outputs an output command signal 17a. An output control means 19 controls the output of the VVVF inverter 14 with the output command signal 17a. A conduction ratio control means 20 controls a conduction ratio of a later-described brake chopper 21 in correspondence to the output reduction signal 16a. The brake chopper 21 which is serially connected to a brake resistor 22 is connected to an input side of the VVVF inverter 14. The energy being generated by the induction motor 15 when the brake is applied is consumed by the brake resistor 22. Additionally, at the time of power run, the conduction ratio of brake chopper 21 is controlled by the conduction ratio control means 20 in accordance with the output reduction signal 16a. A reflux diode 23 acts at operation of the brake chopper 23.

The following describes the actions. In FIGS. 1 and 2A to 2C, the output from the diesel electric locomotive (not shown in the figures) is expressed as Expression (1):

$$\text{(Locomotive output)} = \text{(Constant)} \times \text{(Traction)} \times \text{(Locomotive speed)} \quad (1)$$

As shown in FIG. 2A, in the low speed range, the locomotive output is small because the speed is low even if the traction is great. Consequently, small output of the diesel engine 10 is sufficient. With increase in the locomotive speed, the engine output also increases. When the output of the diesel engine reaches a maximum, as shown in FIG. 2B, the output becomes constant while the traction decreases in inverse proportion to the speed as shown in FIG. 2A.

The diesel engine 10 revolves at an idling revolution speed when the output is zero, and the revolving speed increases as the output increases. If the excitation current for the alternating current generator 12 is controlled at a constant value, since the output voltage of the alternating current generator 12 is in proportion to the level of the diesel engine 10, the input voltage of the direct current power supplied to the VVVF inverter 14 will be as shown in FIG. 2C. At this stage, through inversion into the alternating current power by the VVVF inverter 14, the driving force control of the induction motor 15 at the time of power run is conducted. In this case, the induction motor 15 is controlled so as to output a torque corresponding to the target value command signal 18 that is instructed by the output control means 19.

If wheel slip occurs at the time of power run, the revolving speed of the induction motor 15 increases sharply. The slip control means 16 detects wheel slip when the revolving speed of the induction motor 15 increases sharply and outputs the output reduction signal 16*a* corresponding to the level of slip. The adder 17 outputs the add signal 17*a* that is an addition of the target value command signal 18 (+) and the output reduction signal 16*a* (−) to the output control means 19. The output control means 19 controls the induction motor 15 via the VVVF inverter 14 so as to output predetermined output torque with the add signal 17*a*.

On the other hand, the conduction ratio control means 20 controls the conduction ratios of the brake chopper 21 corresponding to the level of the output reduction signal 16*a* so that the brake resistor 22 will consume such power supplied from the alternating current generator 12 via the rectifier 13 as to correspond with the output torque reduction of the induction motor 15.

When the brake is applied, the diesel engine 10 slips. Then, the voltage generated by the induction motor 15 is detected by a voltage detecting means (not shown in the figures) and the conduction ratio of the brake chopper 21 is controlled in accordance with the generated voltage. The energy generated by the induction motor 15 is consumed by the brake resistor 22 so as to reduce the diesel electric locomotive speed.

As described above, prompt re-cohesion of the wheels is intended through reducing the output torque of the induction motor 15 with the output reduction signal 16*a* that is output in accordance with the wheel slip level, and the brake resistor 22 consumes such power of energy supplied from the diesel engine 10 side via the brake chopper 21 as to correspond with the output torque reduction of the induction motor 15. Thus, increase in the output voltage of the alternating current motor 12 is successfully prevented and thus the input voltage of the VVVF inverter 14 can be stabilized.

[Second Embodiment]

Figure 3:
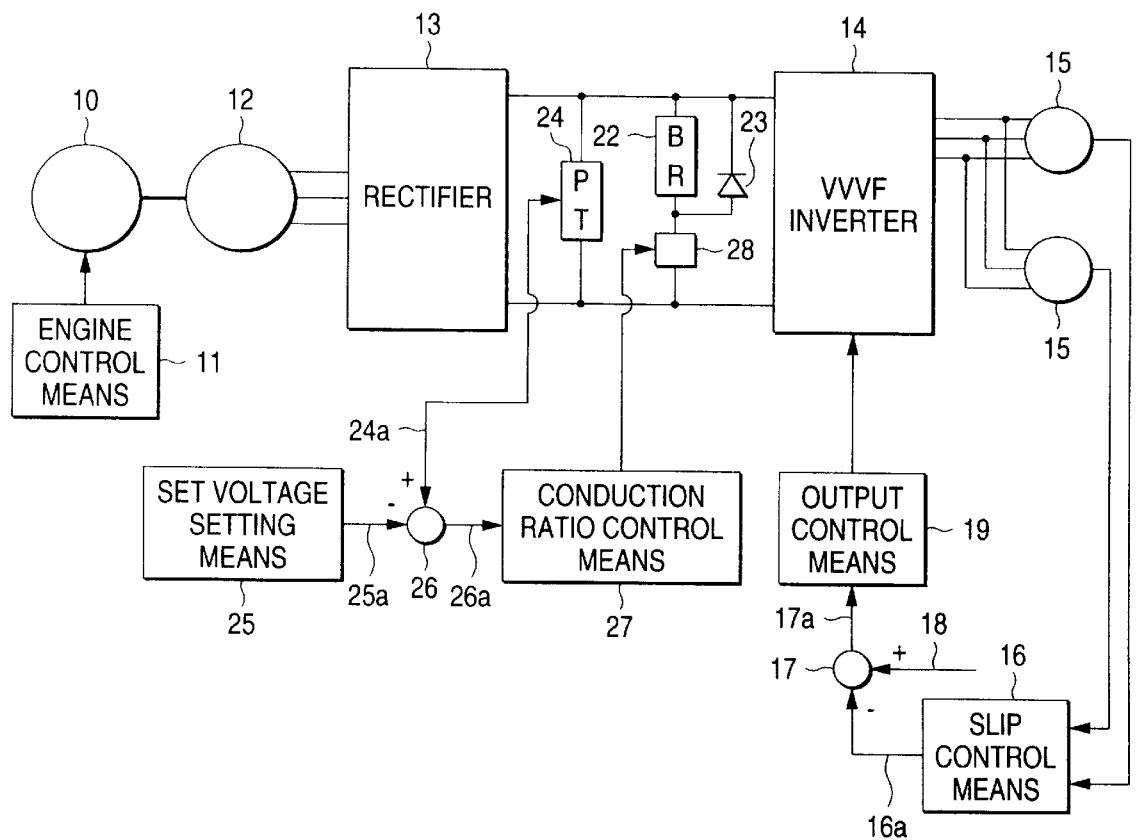
FIG. 3 is a block diagram showing the second embodiment of the present invention.

FIG. 3 is a block diagram showing a structure of a second embodiment. In FIG. 3, elements 10 through 19, 22 and 23 are the same as those of the first embodiment. A voltage detecting means 24 detects input voltage of the VVVF inverter 14 and outputs a voltage detection signal 24*a* corresponding to the input voltage of the VVVF inverter 14. A set voltage setting means 25 outputs a set voltage signal 25*a* corresponding to the input voltage when the output from the diesel engine 10 exceeds a set value which is 10%, for example, higher than the input voltage to the VVVF inverter 14 in a constant speed range. An adder 26 adds the voltage detection signal 24*a* (+) to the set voltage signal 25*a* (−) and outputs an add signal 26*a*. The add signal 26*a* to be output from the adder 26 is set up so as to be zero if the voltage detection signal 24*a* is smaller than the set voltage signal 25*a*. A conduction ratio of a later-described brake chopper 28 is controlled with the add signal 26*a*. The brake chopper 28 which is serially connected to brake resistor 22 is connected to an input side of the VVVF inverter 14 and the brake resistor 22 consumes the energy being generated by the induction motor 15 when the brake is applied. Additionally, at the time of power run, the conduction ratio of brake chopper 28 is controlled by a conduction ratio control means 27 in correspondence to the output reduction signal 26*a*.

The following describes the actions. In FIG. 3, at the time of power run, the alternating current power generated with the output from the diesel engine 10 by the alternating current generator 12 will be rectified into direct current power by the rectifier 13, then the direct current power is inverted into the alternating current power by the VVVF inverter 14, and the induction motor 15 is controlled so as to output a torque that corresponds to the target value command signal 18.

If wheel slip occurs at the time of power run, the induction motor 15 is controlled by the output control means 19 via the VVVF inverter 14 so as to output predetermined output torque that corresponds to the output reduction signal 16*a* with the add signal 17*a*. The actions so far described above are the same as those of the first embodiment.

When the output torque of the induction motor 15 is reduced with occurrence of slip, since the diesel engine 10 cannot follow to drop the output immediately, the revolving speed of the diesel engine 10 increases abnormally. As the result, the output voltage of the alternating current generator 12 that is connected directly to the diesel engine 10 increases and thus the input voltage to the VVVF inverter 14 also increases. When the voltage detection signal 24*a* that is output from the voltage detecting means 24 exceeds the set voltage signal 25*a* for the action start voltage of the brake chopper 28, which is set by the set voltage setting means 25, the add signal 26*a* is output and the conduction ratio of the brake chopper 28 is controlled via the conduction ratio control means 27. Thus, the brake resistor 22 consumes such power as to correspond with the output torque reduction of the induction motor 15 through the conduction ratio control of the brake chopper 28.

When the brake is applied, the diesel engine 10 idles while the conduction ratio of the brake chopper 28 is controlled in accordance with the voltage generated by the induction motor 15. Thus, the energy generated by the induction motor 15 is consumed by the brake resistor 22 so as to reduce the diesel electric locomotive speed.

As described above, in addition to conducting prompt re-cohesion of the wheels through reducing the output torque of the induction motor 15 with the output reduction signal 16*a* that is output in accordance with the wheel slip level, the brake resistor 22 consumes such power of energy supplied from the diesel engine 10 via the brake chopper 28 as to correspond with the output torque reduction. Accordingly, increase in the output voltage of the alternating current motor 12 is successfully prevented and thus the input voltage of the VVVF inverter 14 can be stabilized.

[Third Embodiment]

Figure 4:
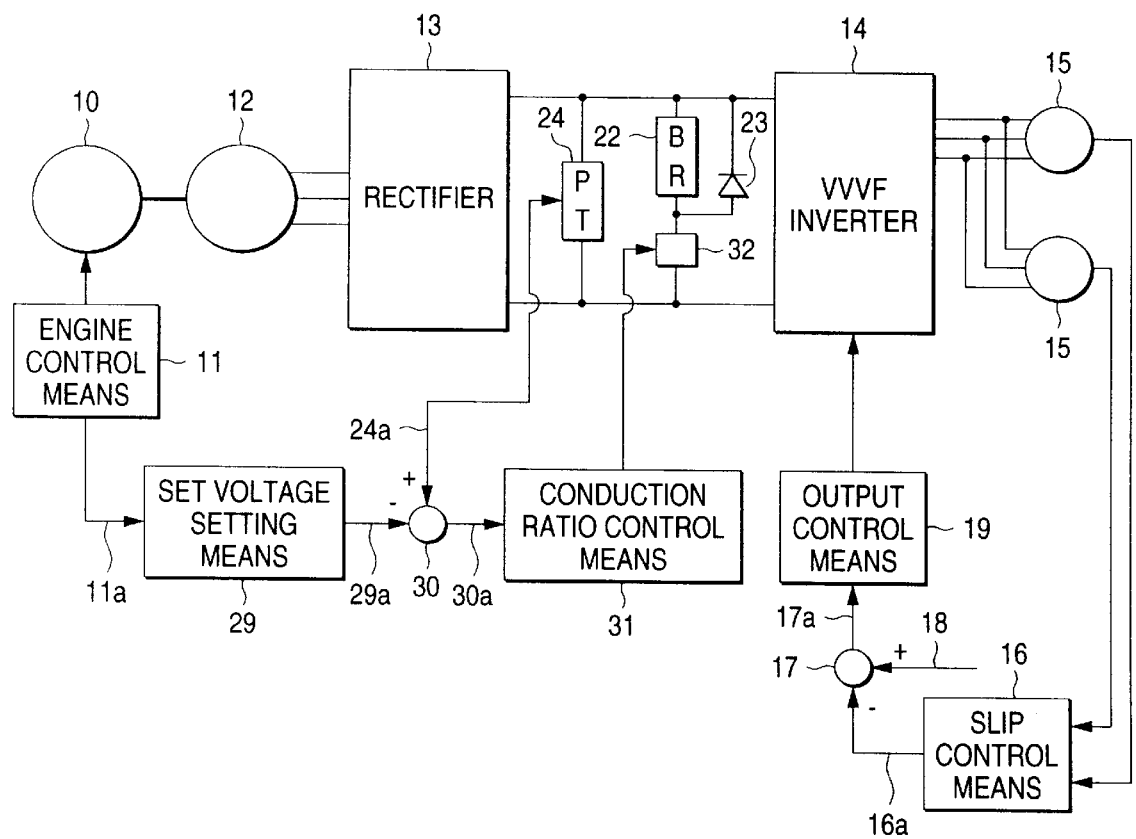
FIG. 4 is a block diagram showing the third embodiment of the present invention.

FIG. 4 is a block diagram showing a structure of a third embodiment. In FIG. 4, elements 10 through 19, 22 and 23 are the same as those of the first embodiment and element 24 is the same as that of the second embodiment.

A set voltage setting means 29 for setting an action start voltage for a later-described brake chopper 32, and a 10% higher voltage, for example, is set as the action start voltage.

Figure 5:
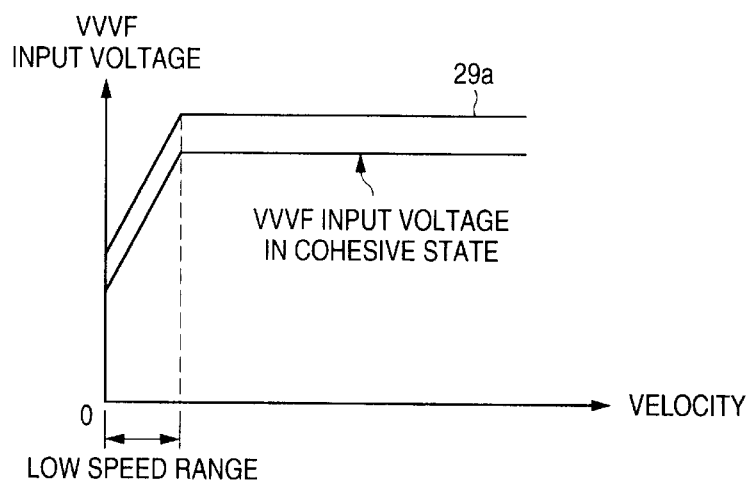
FIG. 5 is an illustrative drawing showing the actions in FIG. 4.
Figure 6:
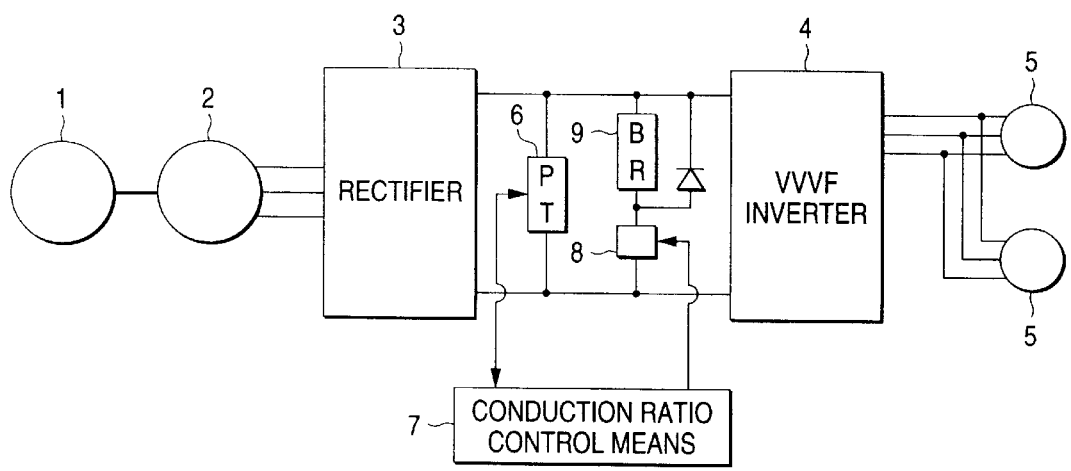
FIG. 6 is a block diagram showing a related diesel electric locomotive controller.

As shown in FIG. 2B, in the low speed range of the diesel electric locomotive, output of the diesel engine 10 increases in proportion to the speed. In the same way as the output of the diesel engine 10, the input voltage of the VVVF inverter 14 also increases. Therefore, in the low speed range, a set value of a set voltage signal 29a output from the set voltage setting means 29 is set so as to increase at a predetermined ratio, as shown in FIG. 5, in correspondence to the output of the diesel engine 10 by an engine output signal 11a from the engine control means 11. In a speed range where the output of the diesel engine 10 is constant, the set voltage signal 29a is set so as to be higher than the input voltage by a predetermined value of 10%, for example, in the same way as in the second embodiment.

An adder 30 adds the set voltage signal 29a and the voltage detection signal 24a that is output from the voltage detecting means 24, and outputs an add signal 30a. The add signal 30a to be output from the adder 30 is set up so as to be zero if the voltage detection signal 24a is smaller than the set voltage signal 29a. A conduction ratio control means 31 controls the conduction ratio of a later-described brake chopper 32 with the add signal 30a. The brake chopper 32 which is serially connected to the brake resistor 22 is connected to an input side of the VVVF inverter 14 and the brake resistor 22 consumes the energy being generated by the induction motor 15 when the brake is applied. Additionally, at the time of power run, the conduction ratio of brake chopper 32 is controlled by a conduction ratio control means 31 in correspondence to the output reduction signal 30a.

The following describes the actions. In FIG. 4, at the time of power run, the alternating current power generated with the output from the diesel engine 10 by the alternating current generator 12 will be rectified into direct current power by the rectifier 13, then the direct current power is inverted into the alternating current power by the VVVF inverter 14, and the induction motor 15 is controlled so as to output a torque that corresponds to the target value command signal 18.

If wheel slip occurs at the time of power run, the induction motor 15 is controlled by the output control means 19 via the VVVF inverter 14 so as to output predetermined output torque that corresponds to the output reduction signal 16a with the add signal 17a. The actions so far described above are the same as those of the first embodiment.

In the low speed range before the output of the diesel engine 10 reaches a constant value as shown in FIG. 2B, the input voltage of the VVVF inverter 14 increases in proportion to the speed from the idling state to the speed range that the output reaches the constant value, as shown in FIG. 2C. Therefore, in response to an engine output signal 11a which is output from an engine control means 11 in the low speed range, a set voltage signal 29a which determines an action start voltage of the brake chopper 32, as shown in FIG. 5, is set by a set voltage setting means 29. Then, the adder 30 adds the voltage detection signal 24a (+) that has been detected by the voltage detecting means 24 to the set voltage signal 29a (−) and outputs the result of the addition as the add signal 30a to the conduction ratio control means 31. In this case, if wheel slip does not occur, since the voltage detection signal 24a is smaller than the set voltage signal 29a, the conduction ratio control of the brake chopper 32 will not be carried out. If wheel slip occurs at this moment, the slip control means 16 detects this and reduces the output torque of the induction motor 15 via the VVVF inverter 14. This is followed by increase in the revolving speed of the diesel engine 10 and thus the input voltage to the VVVF inverter 14 increases. When the voltage detection signal 24a exceeds the set voltage signal 29a, the adder 30 outputs the add signal 30a and the conduction ratio control means 31 controls the conduction ratio of the brake chopper 32. Thus, the brake resistor 22 consumes such power as to correspond with the output torque reduction of the induction motor 15 through the conduction ratio control of the brake chopper 32.

If wheel slip occurs in the speed range where the output of the diesel engine 10 is of a constant value, the action start voltage of the brake chopper 32 has been raised by a predetermined value in accordance with a maximum value of the input voltage to the VVVF inverter 14 in the cohesive state where no slip occurs. Consequently, on occurrence of the slip, the slip control means 16 detects this and reduces the output torque of the induction motor 15 and, if the input voltage to the VVVF inverter 14 exceeds the set value, the conduction ratio control of the brake chopper 32 is carried out as the same way as in the second embodiment.

Additionally, when the brake is applied, the diesel engine 10 idles while the conduction ratio of the brake chopper 32 is controlled in accordance with the voltage generated by the induction motor 15. Thus, the energy generated by the induction motor 15 is consumed by the brake resistor 22 so as to reduce the diesel electric locomotive speed.

As described above, in the low speed range, the set value of the action starting voltage for actuating the brake chopper 32 so as to match the output of the diesel engine 10 is varied. Accordingly, the brake resistor 22 can consume such power as to correspond with the reduction in the output torque of the induction motor 15 till the time the output of the diesel engine 10 reaches the input voltage to the VVVF inverter 14 in the speed range of a constant value. Thus, the stability of the re-cohesion control can be enhanced.

According to the invention, prompt re-cohesion of the wheels is intended through reducing the output torque of the induction motor 15 with the output reduction signal 16a that is output in accordance with the wheel slip level. Further, the brake resistor 22 consumes via the brake chopper 21 such power of energy supplied from the diesel engine 10 side as to correspond with the output torque reduction of the induction motor 15. Thus, increase in the output voltage of the alternating current motor 12 is successfully prevented and thus the input voltage of the VVVF inverter 14 can be stabilized.

In addition, the brake resistor 22 may consume via the brake chopper 21 such power of energy supplied from the diesel engine 10 as to correspond with the output torque reduction, in accordance with the input voltage of the VVVF inverter. Thus, increase in the output voltage of the alternating current motor 12 is successfully prevented and thus the input voltage of the VVVF inverter 14 can be stabilized.

Further, in the low speed range, the set value of the action starting voltage for actuating the brake chopper 32 so as to match the output of the diesel engine 10 can be varied. Thus, the brake resistor 22 can consume such power as to correspond with the reduction in the output torque of the induction motor 15 till the time the output of the diesel engine 10 reaches the input voltage to the VVVF inverter 14 in the speed range of a constant value, and the stability of the re-cohesion control can be enhanced.

The present disclosure relates to the subject matter contained in Japanese patent application No. Hei. 10-186750 filed on Jul. 2, 1998 which is expressly incorporated herein by reference in its entirety.

While only certain embodiments of the invention have been specifically described herein, it will apparent that numerous modification may be made thereto without departing from the spirit and scope of the invention.

What is claimed is:

1. A controller for diesel electric locomotive, in which, after output from an alternating current generator driven by a diesel engine is rectified into direct current power, said direct current power is inverted into alternating current power by an inverter to thereby carry out a power run control of an induction motor, and energy generated by said induction motor is consumed at a brake resistor by moving a brake chopper when the brake is applied, wherein when a revolving speed of said induction motor exceeds a predetermined value at the time of power run, slip control means detects slip of wheels and outputs an output reduction signal for said induction motor in correspondence to a level of slip, an output torque of said induction motor is reduced with said output reduction signal, and a reduced amount of the output torque of said induction motor is consumed at a brake resistor through a conduction ratio control of said brake chopper.

2. A controller for diesel electric locomotive according to claim 1, wherein the conduction ratio of said brake chopper is controlled by said output reduction signal output from said slip control means.

3. A controller for diesel electric locomotive according to claim 1, wherein the conduction ratio of said brake chopper is controlled when an input voltage of said inverter exceeds a predetermined value.

4. A controller for diesel electric locomotive according to claim 3, wherein in a low speed range from the idling state to a maximum output, the brake chopper is operated when an output voltage of the diesel engine exceeds a set value that is set up to be higher at a predetermined rate than the input voltage of said inverter in a cohesive state of the wheels.

5. A controller for diesel electric locomotive, in which, after output from an alternating current generator driven by a diesel engine is rectified into direct current power, said direct current power is inverted into alternating current power by an inverter to thereby carry out a power run control of an induction motor, and energy generated by said induction motor is consumed at a brake resistor by moving a brake chopper when the brake is applied, said controller comprising:

slip control means detecting slip of wheels and outputting an output reduction signal in correspondence to a level of slip, when a revolving speed of said induction motor exceeds a predetermined value at the time of power run;

output control means controlling the output of said inverter on the basis of said output reduction signal; and conduction ratio control means controlling a conduction ratio of said brake chopper.

6. A controller for diesel electric locomotive according to claim 5, further comprising:

an adder adding said output reduction signal and a target value command signal which instructs an output value of the induction motor at the time of power run and outputting an output command signal to said output control means.

7. A controller for diesel electric locomotive according to claim 5, wherein said conduction ratio control means is controlled with said output control signal output from said slip control means.

8. A controller for diesel electric locomotive according to claim 5, further comprising:

voltage detecting means detecting input voltage of said inverter; and set voltage setting means outputting a set voltage signal which controls said conduction ratio control means, when the input voltage of said inverter exceeds a predetermined value.

9. A controller for diesel electric locomotive according to claim 8, wherein in a low speed range from the idling state to a maximum output, the brake chopper is operated when an output voltage of the diesel engine exceeds a set value that is set up to be higher at a predetermined rate than the input voltage of said inverter in a cohesive state of the wheels.

* * * * *